Jan. 15, 1946. R. F. PIERCE ET AL 2,393,058
MAKING THERMOPLASTIC HELICOIDAL STRUCTURE
Filed Aug. 25, 1943 2 Sheets-Sheet 2

INVENTORS
James E. Pierce
Russell F. Pierce
BY
Dean Lawrence
ATTORNEY

Patented Jan. 15, 1946

2,393,058

UNITED STATES PATENT OFFICE 2,393,058

MAKING THERMOPLASTIC HELICOIDAL STRUCTURES

Russell F. Pierce and James E. Pierce, Bay City, Mich., assignors to Pierce Plastics, Inc., Bay City, Mich., a corporation of Michigan Application August 25, 1943, Serial No. 500,024

6 Claims. (Cl. 18—19)

This invention relates to a continuous method and apparatus for making thermoplastic helicoidal structures from thermoplastic tapes, rods, or strips.

Thermoplastic helicoidal structures, such as are used widely on telephone cords to prevent kinking, as insulators or spacers in co-axial cables, as bookbinding hinge, and for many other purposes, have heretofore been made by winding a length of thermoplastic tape on a stationary mandrel and heating the tape while held in position on the mandrel sufficiently to set it. After cooling, the thermoplastic helicoidal structure is stripped from the mandrel. Such processes are, however, time consuming and expensive to operate and are not well adapted to continuous and automatic operation.

It is, therefore, an object of the present invention to provide a continuous and economical method for making a thermoplastic helicoidal structure from a thermoplastic tape.

These and related objects are accomplished by continuously winding a thermoplastic tape on a rotating mandrel while spacing the coils of the tape on the mandrel and heating it sufficiently to set it permanently in helicoidal form. The mandrel is usually unsupported at the forward end, i. e. the end toward which the helicoidal structure is being forwarded, and the structure is pushed off the end of the mandrel and may be cut into desired lengths.

The invention may be understood readily by reference to the accompanying drawings wherein, in the interest of clarity, certain features are shown on a somewhat exaggerated scale.

Figure 1:
Figure 1 is a plan view of a thermoplastic helicoidal structure made by the process and apparatus of the invention.

The helicoidal structure of Figure 1 produced by the method and apparatus of the present invention is characterized by several advantages. Thus, due to the continuous nature of the operation, the tape may be forwarded at constant speed through the heating zone while the latter is maintained at a constant temperature which insures uniformity in the final product and the avoidance of unequal stresses therein. The structure is further characterized by the uniform diameter and spacing of the separate coils. The apparatus of the invention is simple to construct and economical to maintain. The method, due to its continuous and automatic nature, is characterized by its high efficiency of thermoplastic material and low operating cost.

Helicoidal structures may be made from ordinary extruded thermoplastic tape of virtually any composition and cross-sectional shape without substantial distortion of its cross-sectional shape.

Thermoplastics which may be used include cellulose acetate, cellulose acetobutyrate, cellulose nitrate, ethyl cellulose, polyvinyl chloride, polyvinylidene chloride, and acrylate resin compositions.

Figure 2:
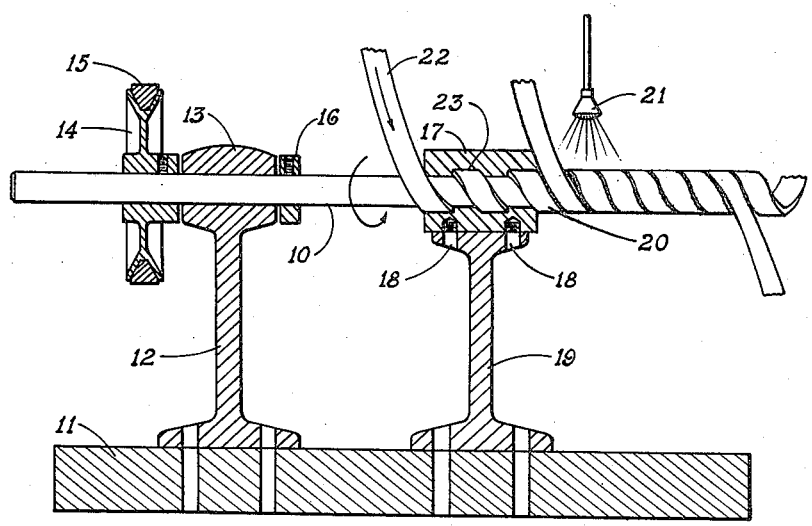
Figure 2 is an elevation, partly in section, of a machine for making continuously a helicoidal structure from a thermoplastic tape.

Referring now to Figure 2, a mandrel 10, supported and secured to a base member 11 as by a standard 12 and bearing 13, is rotated as by a motor (not shown) and a V-belt 15 driving a pulley 14 secured to the mandrel. End play of the mandrel within the bearing 13 may be prevented as by a collar 16 secured to the mandrel on the opposite side of the bearing. A stationary barrel or cylinder 17 is positioned around the mandrel and held rigidly in place as by screws or bolts 18 securing it to a standard 19 which may in turn be bolted to the base 11. The inner surface of the barrel 17 is provided with a helical groove 23, the cross-section of which is preferably, but not necessarily, of approximately the same shape and area as that of the tape from which the thermoplastic helicoidal structure is to be made. The internal diameter of the barrel is such that it may be slipped easily along the mandrel into place. Although the barrel may act somewhat in the capacity of a guide for the rotating mandrel, it is not usually considered as constituting a bearing therefor except in the case of mandrels of very small diameter which may be subject to a certain amount of vibration when unsupported except by the bearing 13. The mandrel is unsupported at its forward end to allow the formed helicoidal structure to slip or be pushed off the end of the mandrel. The mandrel need extend through the barrel 17 only far enough to allow the tape wound and heated thereon to grip the mandrel so as to prevent substantial sliding of the tape around the mandrel. A nozzle 21 or other means may be provided by means of which a stream of heated fluid such as hot water, hot oil, steam or even hot air, may be directed on to the coiled tape to heat it sufficiently to set it permanently in helicoidal form.

In operation, a thermoplastic tape 22 taken from a supply reel (not shown) or directly from an extrusion operation is threaded through the helical groove 23 in the barrel 17 with the mandrel stationary. A filler strip 22a of the same thermoplastic material from a supply reel (not shown) is run into the mandrel 10 between the coils 20 of the tape 22 as it issues from the helically grooved barrel 17. This filler strip 22a may be of any desired width reasonably approximating the width of the lands in the barrel 17 and serves to fix the spacing of the coils 20. Several coils of the tape are wound around the mandrel forward of the barrel and held in place while the heating fluid is allowed to flow from the nozzle 21 over the wound tape for a few seconds or until the tape has set or relaxed sufficiently to assume the shape in which it is held. A hole or slot (not shown) may be provided in the forward end of the mandrel through which the end of the tape may be threaded to hold it in place during the preliminary step just described. The mandrel is then started to rotate and process thereafter proceeds automatically and continuously, it being only necessary to collect the helicoidal structure and filler tape as they are pushed off the forward end of the mandrel. The structure may be wound on a collecting reel or it may be cut into desired lengths and these collected. Frequently the machine is run in cooperation with a cutter (not shown) which automatically severs the structure into predetermined lengths.

Although, as just described, the tape may be heated by flowing a hot fluid over it, it has been found advantageous at times to heat the helically grooved barrel so that the tape is heated as it is drawn through the groove in the barrel. This may be accomplished readily as shown in Figures 3 and 4 by providing ducts 24 within the body of the barrel 17 through which a hot fluid may be circulated by way of inlet and outlet ports 25.

In certain instances, such as in the case of certain cellulose acetate thermoplastic compositions, the heated tape upon cooling tends to grip the mandrel only loosely and the mandrel may rotate within the coils of tape without drawing additional tape through the barrel. In such instances, the machine can be modified by providing means to maintain the tape in firm contact with the mandrel at some point after it has been heated. One such means is illustrated in Figure 3 wherein a roller 26 is provided which rotates freely on a spindle 27, which is usually parallel with the longitudinal axis of the mandrel 10. The spindle 27 is supported in a bracket 28 attached to a post 29, which is in turn slidably but non-rotatably mounted as in a hollow support 30 fixed to the base 11. Roller 26 is maintained under compression in contacting the coiled tape 31 on the mandrel.

Figure 4:
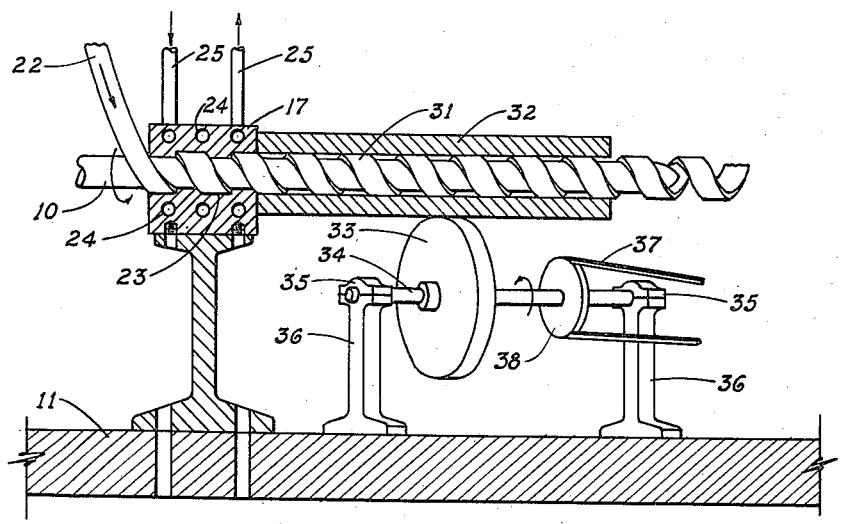
Figure 4 is an elevation, partly in section, of still another modification of a part of the machine of Figure 1.

In another modification of the machine shown in Figure 4, a different means is provided for maintaining the coiled tape 31 in firm contact with the mandrel 10. Plastic tape 22 is drawn through the helicoidal groove 23 in the heated barrel 17 and thereafter the helicoidal structure 31 slides forward along the mandrel. A cylinder or bushing 32 of internal diameter such that it fits snugly over the structure 31 on the mandrel is provided and rotated as by a friction wheel 33 pressing against its outer surface. The cylinder 32 is rotated in the same direction as the mandrel and somewhat faster than the latter so that it causes the structure 31 to grip the mandrel tightly. The friction wheel 33 may be mounted on a shaft 34 which turns in bearings 35 secured to standards 36 which are bolted to the base 11. The shaft 34 may be driven as by a motor (not shown) and a belt 37 which rotates a pulley 38 mounted on the shaft. The longitudinal axis of the shaft 34 preferably, but not necessarily, lies at a small angle to the longitudinal axis of the mandrel 10 in such manner that the bushing as it rotates has no tendency to slip forward along the mandrel, but usually rotates with its end pressing lightly against the end of the barrel 17.

Figure 3:
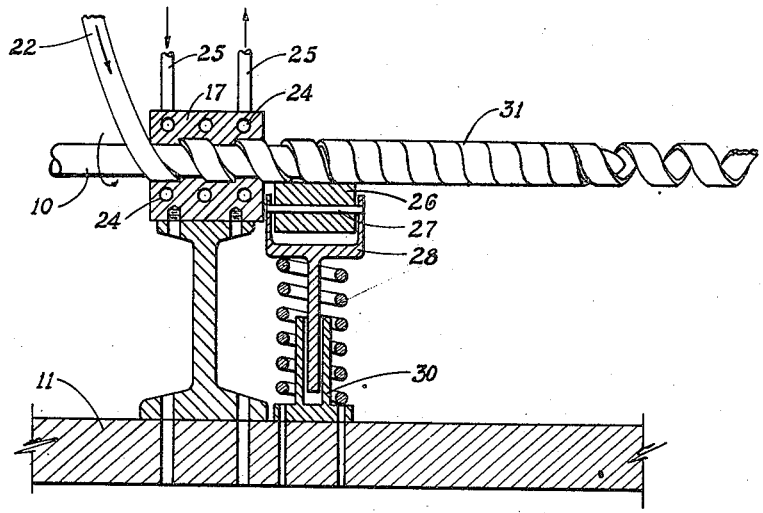
Figure 3 is an elevation partly in section, of a modification of a part of the machine of Figure 2.

In a typical instance, a Vinylite tape 0.060 inch square was converted into a helicoidal structure using the machine illustrated in Figure 3. The mandrel was ⅜ inch in diameter and projected about 8 inches forwardly of the barrel. The helical groove in the inner surface of the barrel was slightly deeper than the thickness of the tape. The land between the turns of the groove was 0.020 inch wide. The barrel was heated by circulating oil at a temperature of about 85° centigrade through it and the mandrel was rotated at a speed of about 250 revolutions per minute. Air at a temperature of about 85° centigrade was blown over the coil on the mandrel outside the barrel. The helicoidal structure which was pushed continuously from the forward end of the mandrel has a uniform internal diameter of ⅜ inch.

As shown, a filler strip of any suitable material may be led onto the mandrel as it leaves the heated barrel, between the coils of the formed thermoplastic helices, if desired. Such filler strip may be utilized temporarily for maintaining the spacing of the coils in the event that a barrel having a relatively wide land is being utilized. In other cases, the filler strip may become part of the finished article.

We claim:

1. In an apparatus for continuously making an organic thermoplastic helicoidal structure from an organic thermoplastic tape, the combination including: a rotatable smooth mandrel; means to rotate the mandrel; means to wind a thermoplastic tape on the rotating mandrel, to space the coils thereof evenly thereon and to forward the helically wound tape slidably along the mandrel; means to heat the helically wound tape while being forwarded on the mandrel; and means to maintain the heated helically wound tape in close contact with the mandrel after it leaves the winding means.

2. In an apparatus for continuously making a thermoplastic helicoidal structure from a thermoplastic tape, the combination including: a rotatable smooth mandrel; means to rotate the mandrel; an internally helically grooved stationary barrel positioned around the mandrel adapted to space the coils of the tape on the mandrel and to forward the helically wound tape slidably along the mandrel; and heating means adapted to heat the helically wound tape as it slides along the mandrel after it leaves the winding means.

3. In an apparatus for continuously making a thermoplastic helicoidal structure from a thermoplastic tape, the combination including: a rotatable smooth mandrel; means to rotate the mandrel; a heated, internally helically grooved stationary barrel positioned around the mandrel adapted to wind a thermoplastic tape on the rotating mandrel, to space the coils of the wound tape on the mandrel, to heat the wound tape on the mandrel and to forward the heated, helically wound tape slidably along the mandrel after it leaves the winding means.

4. In an apparatus for continuously making a thermoplastic helicoidal structure from a thermoplastic tape, the combination including: a rotatable smooth mandrel; means to rotate the mandrel; an internally helically grooved stationary barrel positioned around the mandrel adapted to space the coils of the tape in helical form on the mandrel and to forward the helically wound tape slidably along the mandrel; heating means adapted to heat the helically wound tape as it slides along the mandrel; and means adapted to maintain the formed helicoidal structure in firm contact with the mandrel thereby to prevent slippage of the structure around the mandrel after it leaves the winding means.

5. In an apparatus for continuously making a thermoplastic helicoidal structure from a thermoplastic tape, the combination including: a rotatable smooth mandrel; means to rotate the mandrel; an internally helically grooved stationary barrel positioned around the mandrel adapted to space the coils of the tape in helical form on the mandrel and to forward the helically wound tape slidably along the mandrel; heating means adapted to heat the helically wound tape as it slides along the mandrel; and a spring tensioned roller adapted to press the helicoidal structure against the mandrel, thereby to prevent slippage of the structure around the mandrel.

6. In an apparatus for continuously making a thermoplastic helicoidal structure from a thermoplastic tape, the combination including: a rotatable smooth mandrel; means to rotate the mandrel; an internally helically grooved stationary barrel positioned around the mandrel adapted to space the coils of the tape in helical form on the mandrel and to forward the helically wound tape slidably along the mandrel; heating means adapted to heat the helically wound tape as it slides along the mandrel; and a rotatable sleeve coaxial longitudinally with the mandrel adapted to be rotated around the helicoidal structure on the mandrel and at a rotational speed greater than that of the mandrel, thereby to prevent slippage of the structure around the mandrel.

RUSSELL F. PIERCE.
JAMES E. PIERCE.